US008214075B2

(12) United States Patent
Griffin et al.

(10) Patent No.: US 8,214,075 B2
(45) Date of Patent: Jul. 3, 2012

(54) SYSTEM AND METHOD FOR MODELLING A FLIGHT

(75) Inventors: Mark Raymond Griffin, Christchurch (NZ); Mervyn Lloyd Robertson, Wellington (NZ)

(73) Assignee: Airways Corporation of New Zealand Limited, Wellington (NZ)

( * ) Notice: Subject to any disclaimer, the term of this patent is extended or adjusted under 35 U.S.C. 154(b) by 447 days.

(21) Appl. No.: 12/201,194

(22) Filed: Aug. 29, 2008

(65) Prior Publication Data

US 2009/0094011 A1 Apr. 9, 2009

Related U.S. Application Data

(63) Continuation of application No. PCT/NZ2007/000043, filed on Mar. 2, 2007.

(30) Foreign Application Priority Data

Mar. 2, 2006 (NZ) ........................................ 544381

(51) Int. Cl.
*G01C 21/00* (2006.01)
(52) U.S. Cl. .............. 700/200; 725/69; 725/76; 725/72; 725/77; 348/E7.086; 348/E7.085; 348/E7.093; 455/12.1; 455/431; 379/90.01; 416/32; 343/757
(58) Field of Classification Search .................. 701/200; 725/69, 76, 72, 77; 348/E7.086, E7.085, 348/E7.093; 455/431, 12.1; 279/217.3; 379/90.01; 416/32; 343/757
See application file for complete search history.

(56) References Cited

U.S. PATENT DOCUMENTS

| 3,899,662 | A | * | 8/1975 | Kreeger et al. ............... 345/619 |
| 6,131,065 | A | | 10/2000 | Marszalek |
| 6,335,733 | B1 | * | 1/2002 | Keren et al. .................... 345/418 |
| 6,633,810 | B1 | | 10/2003 | Qureshi et al. |
| 6,812,890 | B2 | | 11/2004 | Smith et al. |
| 7,132,982 | B2 | * | 11/2006 | Smith et al. ................... 342/456 |
| 7,248,219 | B2 | * | 7/2007 | Smith et al. ................... 342/456 |
| 7,406,498 | B2 | * | 7/2008 | Reshef et al. ................. 709/203 |
| 7,599,847 | B2 | * | 10/2009 | Block et al. ........................ 705/5 |
| 7,612,716 | B2 | * | 11/2009 | Smith et al. ................... 342/454 |
| 7,680,883 | B2 | * | 3/2010 | Reshef et al. ................. 709/203 |
| 2002/0016724 | A1 | * | 2/2002 | Yang et al. ......................... 705/6 |
| 2002/0162057 | A1 | * | 10/2002 | Talagala ........................... 714/54 |
| 2003/0093219 | A1 | * | 5/2003 | Schultz et al. ................ 701/202 |
| 2004/0019509 | A1 | * | 1/2004 | Bekkers ............................ 705/5 |

(Continued)

OTHER PUBLICATIONS

AirNav VFR PC Flight Planner for Windows, Apr. 1, 2004 http://web.archive.org/web/20040401120421/http://www.sentientsoftware.com.au/info3.htm.

(Continued)

*Primary Examiner* — James P Trammell
*Assistant Examiner* — McDieunel Marc
(74) *Attorney, Agent, or Firm* — Knobbe, Martens, Olson & Bear LLP

(57) ABSTRACT

A method of modelling a flight of an aircraft using at least one computer system is disclosed. In one embodiment, the method includes: sourcing flight details from at least one data source using at least one data acquisition system, the flight details representative of the activity of the aircraft within a flight information region, and compiling a flight model from the flight details using a processing system, the flight model indicating the activity of the aircraft over the duration of the flight in two or more FIRs or for an entire flight undertaken in a single FIR.

44 Claims, 9 Drawing Sheets

U.S. PATENT DOCUMENTS

| | | | |
|---|---|---|---|
| 2004/0054550 A1* | 3/2004 | Cole et al. | 705/1 |
| 2004/0083126 A1* | 4/2004 | Svenson et al. | 705/10 |
| 2004/0148065 A1 | 7/2004 | Andrews et al. | |
| 2005/0068232 A1 | 3/2005 | Smith et al. | |
| 2005/0103782 A1* | 5/2005 | O'Brien et al. | 220/4.24 |
| 2005/0187812 A1* | 8/2005 | Boedi et al. | 705/10 |
| 2005/0216139 A1* | 9/2005 | Laughlin et al. | 701/3 |
| 2005/0216281 A1* | 9/2005 | Prior | 705/1 |
| 2006/0004602 A1* | 1/2006 | Silverbrook et al. | 705/1 |
| 2006/0085236 A1 | 4/2006 | Smith et al. | |
| 2006/0095329 A1* | 5/2006 | Kim | 705/14 |
| 2006/0247954 A1* | 11/2006 | Hunt | 705/5 |
| 2007/0100962 A1* | 5/2007 | Barth et al. | 709/217 |
| 2007/0106549 A1* | 5/2007 | Stocking | 705/5 |
| 2009/0207048 A1* | 8/2009 | He et al. | 340/973 |
| 2009/0216746 A1* | 8/2009 | Aubin et al. | 707/5 |
| 2010/0030593 A1* | 2/2010 | Kim | 705/5 |

OTHER PUBLICATIONS

International Search Report for International Application No. PCT/NZ2007/000043 dated Jul. 26, 2007 by Australian Patent Office.

Griffin, Flight-Yield™ Unlocking Hidden ATM Revenue to fund major technology projects, Airways New Zealand (Feb. 11, 2006), pp. 1-4, url:http://web.archive.org/web/20060211110847/airways.co.nz/flight-yield/potential.asp.

Anonymous: Flight-Yield™, Airways New Zealand (Feb. 11, 2006, pp. 1-2, url:http://web.archive.org/web/20060211110903/http://airways.co.nz/airways_Services/fag_test.asp.

Anonymous,2005 Annual Report, Airways New Zealand, (Dec. 25, 2005) pp. 1-76, url:http//web.archive.org/web/20051225040654/http://airways.co.nz/documents/2005AR.pdf.

European Supplementary European Search Report dated Apr. 28, 2010.

* cited by examiner

SYSTEM AND METHOD FOR MODELLING A FLIGHT

RELATED APPLICATIONS

This application is a continuation application, and claims the benefit under 35 U.S.C. §§120 and 365 of PCT Application No. PCT/NZ2007/000043, filed on Mar. 2, 2007, which is hereby incorporated by reference.

BACKGROUND OF THE INVENTION

1. Technical Field

This invention relates to a method and system used to determine the services available to a flight of a craft and in particular an aircraft. In particular, the present invention may use computer systems to generate a model of a flight which has been executed, or a hypothetical flight to assist in the calculation of charges to be made to the operator of the aircraft by one or more aviation service providers. Further, the present invention may model the activity of an aircraft from embarkation through to termination of a flight, with such a flight potentially spanning the territories of a number of different aviation service providers.

2. Background Art

Aircraft operators and airlines employ the services of a large number of aviation service providers to transport passengers and cargo. Many different services can be rendered in relation to an aircraft from a number of different service providers. The departure and/or arrival airports can charge for passenger processing, boarding bridge usage, aircraft parking and housing, security charges and also for the use of various airport facilities such as catering, fuel pumping and baggage handling. In addition to airports, air navigation and traffic management service providers may charge an aircraft operator for approach control, departure control, aerodrome control, area control, oceanic area control, metrological data provision, search and rescue services, flight monitoring and pre-flight approval services for example.

Therefore over the course of a flight, numerous costs can be incurred by the aircraft operator with many different aviation service providers. Air navigation and traffic management services will be provided at take off, during transit of a flight and subsequently at landing. Depending on the distance traveled and route taken by an aircraft it is also possible for the responsibility for air traffic management and navigation services to be transferred between multiple service providers working in different geographical regions. The area or region in which a single air traffic management service provider operates may be described as a flight information region (FIR), being a region where air traffic management data is captured and monitored in relation to aircraft activity. Only a single traffic management service provider may operate in each FIR, and passes responsibility for a flight to a different service provider once an aircraft leaves each FIR.

As can be appreciated it is important for aviation service providers to accurately track the services they provide to each individual aircraft and associated flights. It is also important for airlines to monitor the services provided to their aircraft to ensure they are being charged correctly. Currently it is difficult to achieve this aim as scheduled flights may often experience diversions due to weather conditions, emergencies or may be significantly delayed. This provides variances between scheduled flights and the actual flights which have been executed. Furthermore, outside of passenger transport, the scheduling of flights is less rigorously adhered to.

In the calculation of service charges it is also important to ensure that services charged for were actually utilized in relation to a particular flight. Again, a check must be made as to whether an available service which was scheduled to be used was actually used by an aircraft to ensure that the aircraft operator is actually billed for services rendered.

The charging of aircraft operators is generally completed through an investigation of scheduled flights and correlating these with air traffic control tower strip records. Tower strip records can provide information relating to the recorded movements of aircraft and the identities of these aircraft.

This process generally consists of a manual operation completed by each airport to confirm that a scheduled or planned flight did actually take place and depart or arrive at the airport involved. Similar manual processes are also required to confirm which of the available services offered by an airport were actually used by a particular aircraft. The manual nature of these processes inevitably means that some aircraft operators are billed for services which were not rendered, and other aircraft operators are not billed for services rendered. This manual checking process must also be completed at each and every airport involved in the flight.

Some flights, e.g. international, may pass through many different regions and/or stop over at intermediate airports. Each FIR may have different services available which may be chargeable at different rates and thus airline operators are often faced with receiving many invoices from many different service providers that may not be easily attributable to a particular flight.

Furthermore, a service provider, such as an airport's air traffic control, may process hundreds of flights arriving or departing each day and thus it can prove difficult to monitor the time spent processing each flight and determine an appropriate amount to charge. Charges may be determined based on aircraft-type, passenger numbers or similar easily discernable parameters. However, some flights may require extra ground services or more time to process on arrival/departure or movement within the airport. Thus it would be advantageous to provide a system for monitoring all services provided to a flight to accurately distribute service charges.

One attempt to address this issue (for airports in particular) is disclosed in U.S. Pat. No. 6,812,890 by Smith and Bradley. Smith and Bradley describe an airport focused landing detection and identification system configured to automatically invoice aircraft operators. The system disclosed employs one basic source of air traffic management data to detect whether an aircraft has landed. Through monitoring radio traffic (and in particular voice traffic) associated with the landing flight an identification can be made as to whether the aircraft operator is to be automatically charged for airport landing fees.

Smith and Bradley describe a relatively simple automatic charging system which employs a single data source to detect landing events for a single service provider. Although the system disclosed does make some attempt to address the problems of airports with tracking charges, this system cannot be used by air navigation and traffic management service providers to in turn bill for their own services. The system does not monitor the air space usage of an aircraft nor allow for any sophisticated charging schemes or models to be employed by service providers. Furthermore, the Smith and Bradley system does not describe any way to determine all services provided to an aircraft flight either at an airport or en-route between airports.

All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

SUMMARY OF CERTAIN INVENTIVE ASPECTS

It may be desirable to have an improved method or system which addressed any or all of the above problems associated with calculating charges to be applied against a particular flight. In particular, it would be of advantage to have an improved system to facilitate the calculation of charges incurred across multiple flight information regions with multiple aviation service providers. It may also be desirable if such a system could validate whether particular scheduled or available services were actually employed in relation to a particular flight. It would also be of advantage to have an improved system or method of accurately modelling a flight for cost calculation purposes which could in turn facilitate the application of a number of different charging policies as required by users.

One aspect of the present invention addresses the foregoing problems or at least to provide the public with a useful choice.

Aspects of the present invention are herein described with reference to an aircraft flight though it will be readily appreciated by one skilled in the art that the present invention is readily applicable to other transit systems such as rail, automobiles, shipping and the like, and as such these fall within the scope of the invention. Reference to the craft as aircraft herein will thus be understood as being exemplary only and the present invention is not limited to same. Accordingly, references to the journey of the craft or aircraft as a flight is also exemplary and is not limiting.

According to one aspect of the present invention there is provided a method of modelling a flight of an aircraft using at least one computer system, characterised by the steps of;
  sourcing flight details from at least one data source using at least one data acquisition system, the flight details representative of the activity of the aircraft within a flight information region, and
  compiling a flight model from the flight details using a processing system, the flight model indicating the activity of the aircraft over the duration of the flight in two or more FIRs or for an entire flight undertaken in a single FIR.

A flight information region as aforementioned is hereinafter referred to as a geographical region for which a single air traffic management (herein ATM) services provider has responsibility. The flight details sourced to model the flight may be divided into or characterised by flight information regions.

Boundaries between FIRs define where responsibility for air traffic management services is handed from one ATM service provider to another. The ATM service provider associated with a particular FIR can record information on the activities of an aircraft within that particular FIR. Furthermore a single FIR may also include one or more airports where the airport operator can render services to an aircraft during the execution of a flight.

Air traffic management data is sourced from technologies used to track aircraft electronically. For example common forms of air traffic management (ATM) data may include:
  primary and secondary radar ATM systems.
  GPS based tracking systems (e.g. automated dependent surveillance broadcast mode)
  satellite tracking systems (e.g. communications navigation surveillance/air traffic management)
  aviation communication systems (e.g. aeronautical fixed telecommunications network).

Such ATM data can be provided in real time as a flight progresses and can accurately track the activity of an aircraft. Furthermore, ATM data from one source can be validated by ATM data from another source.

According to a further aspect of the present invention there is provided a method of modelling a flight substantially as described above further characterised by the additional subsequent step of:
  processing the flight details with the processing system to determine utilized services from available services, within the FIR, to the flight.

The available services to the flight within the FIR are determined by accessing at least one services availability register including stored data on the available services in at least one the FIR. The services availability register may thus store data on each FIR regarding which services are available to the flight at various times and dates.

In one embodiment, the processing system is capable of determining the utilized services by the flight over the entire duration thereof from the flight model. The flight model provides a complete set of information over the flight regarding the aircraft activity in each FIR and can thus be used to provide information to determine the utilized services over the duration of the flight.

The flight details are compared with known flight factors specific to the flight to determine the utilized services by the flight from the available services. The flight factors may include such factors as: time of day, date, type of flight, aircraft type, aircraft operator and determine which services are utilized from the available services e.g. certain flights may not utilize a particular service as a general rule or other flight-specific factors may need to be taken into consideration According to another aspect of the present invention there is provided a method of modelling a flight substantially as described above, further characterised by the additional subsequent step of;
  calculating at least one cost to be charged to the aircraft operator for at least one the utilized service.

The charge calculation may take into consideration any special arrangements with the aircraft operator as well as the time of day and/or date the utilized service is provided, i.e. services provided at night may incur a surcharge on top of normal charges.

The charges calculated may then be used to generate an invoice to the aircraft operator from the service operator or from a central invoicing system. The invoice may be generated at prescheduled times or on demand.

The present invention is adapted to provide a system and method used to model a flight of an aircraft. In one embodiment, the system implemented to generate such a model may employ one or more computer systems programmed with appropriate computer executable instructions. Reference in the main throughout this specification will be made to the present invention being used to provide a method of modelling a flight of an aircraft. Those skilled in the art should appreciate that an appropriate apparatus or system may be employed to implement such a method, for example, through computer executable instructions programmed in to at least one computer system.

According to another aspect of the present invention there is provided a method of generating invoices for charges for the utilized services incurred by an aircraft during a flight modelled using the method substantially as described herein. A yet further aspect of the present invention provides invoices generated using the method substantially as described herein.

One embodiment of the present invention may be used to model a flight to in turn allow for the automated calculation of charges or costs to be associated with the flight and hence to be billed or invoiced to the operator of the aircraft involved. Flights can employ the services of a number of different organisations during their execution, and the present invention may allow for the automated tracking and subsequent invoicing of costs associated with these services. The present invention may also in some instances be used in a simulation capacity to model a hypothetical flight and subsequently calculate a projected set of services charges to be applied or incurred. For example, in one embodiment the flight details are hypothetical and the processing system is used in a simulation capacity to model a hypothetical flight and subsequently calculate a hypothetical set of services charges to be incurred.

A flight as modelled in conjunction with the present invention may start with a take off event and terminate with a final landing event. A flight as modelled may also include en-route stopovers, take offs and landings in addition to a record of the actual route traveled by the aircraft between initial take off and final landing events. Those skilled in the art should appreciate that some flights as modelled may consist only of a single take off, transit and landing event, whereas others may include multiple take offs and landings for refueling stops or weather diversions when these processes are experienced by a flight.

The modelling of an entire flight allows a complete calculation of all services rendered to the flight to be calculated. Services provided by each airport involved in addition to services provided in transit by ATM service providers all may be modelled in conjunction with the present invention.

According to a further aspect of the present invention there is provided a method of modelling a flight substantially as described above wherein the flight details include at least one flight detail record representative of the activity of an aircraft within a single FIR, the flight detail record generated by a single source of ATM data.

According to yet another aspect of the present invention there is provided a method of modelling a flight substantially as described above wherein a plurality of flight detail records are recorded in relation to the activity of an aircraft from a plurality of sources of ATM data.

According to another aspect of the present invention there is provided a method of modelling a flight substantially as described above wherein the flight model is compiled from a plurality of flight detail records representing the activity of the aircraft within a single FIR. All flight detail records involved essentially represent the same activity of an aircraft and may be used to validate each other to provide a clear picture of the activity of an aircraft.

One embodiment of the present invention may execute an aggregation process with respect to all recorded flight detail records for a particular FIR before a flight model is compiled.

In one embodiment, the aggregation process correlates multiple flight detail records relating to data from a single ATM system into a single aggregated flight detail record. This aggregation process can thus sort through a large number of flight detail records from varying sources of ATM data and correlate together the flight detail records from multiple ATM data sources which pertain to a particular flight.

For example, this aggregation process may be completed by matching paired time and location recordings from each ATM data source with each other.

One embodiment of the present invention may record at least one flight detail record for each and every FIR visited or traversed by an aircraft over the duration of a flight. As discussed above these flight detail records form the flight details of the aircraft within each FIR and represent the activity of an aircraft within that FIR. In one embodiment, the set of flight detail records for each and every FIR involved with a flight is collected to form an accurate and complete flight model.

In one embodiment, a flight detail record may be generated or recorded based on a messaging system employed in relation to ATM systems. Such a messaging system may generate an activation message when the aircraft involved becomes the responsibility of the ATM service provider associated with the particular FIR in question. A flight detail record may then be ready for recording in relation to the present invention once a subsequent deletion message is received from the same source of ATM data. Such deletion messages may represent that the aircraft involved is subsequently no longer the responsibility of the ATM service provider.

One embodiment of the present invention may execute a matching algorithm prior to the compilation of a flight model. This matching algorithm may marry or correlate together consecutive sets of flight detail records from separate FIRs which relate to a single flight. This matching process may detect the transition of an aircraft between FIRs. In particular this process may correlate aircraft position at particular time periods at the boundaries between FIRs to detect a relationship between sets of flight detail records of a single flight sourced from two adjacent FIRs.

Once all relevant flight detail records pertaining to a particular flight has been received a flight model may be calculated. A flight model may represent the activities of an aircraft during the duration of an entire flight, initially as indicated by ATM data sources.

Once all relevant flight detail records have been recorded the flight model may be compiled, and then subsequently validated. This validation stage may assess the flight movements modelled to examine whether such movements are actually physically possible and relate to a consecutive set of movements from a departure point to a flight termination point.

In one embodiment, the flight model includes the utilized services drawn from ATM data and airport-related data sources. The ATM data may be used to indicate the particular type and number of utilized services provided to an aircraft both immediately after take off and en route via one or more transition FIRs through to a destination airport. Airport data sources in turn may also provide information as to both the services available for an aircraft and those services actually taken up or utilized by the aircraft in relation to that particular flight.

Such airport data sources may indicate both the times at which particular services are available and also whether a particular flight or aircraft has utilized such services.

In one embodiment, the generated flight model may be subject to a service validation process. This validation process may confirm the availability of particular services which are recorded as utilized services by the flight. Thus indicated utilized services which could not be offered at such times may subsequently be removed from the flight model.

Once a flight model is populated with all utilized services the flight model may be used to calculate costs or charges to be invoiced to the relevant aircraft operator. Each of the utilized services represented within the flight model will in turn directly relate to a charge to be invoiced to the aircraft operator.

The format or size of costs charged to an aircraft operator may be dictated by specific charging policies selected by each service provider who the aircraft operator has incurred a charge with. Differential charging policies may be applied by each service provider depending on their own requirements and any prior arrangements or agreements made with specific aircraft operators.

For example, in some embodiments charging policies may be implemented through assessing weight carried, distance traveled or flight time duration metrics or alternatively may be charged at a fixed rate if required. Furthermore, any additional information, or parameters required to complete such cost calculations may also be built into the structure of the flight model calculated or potentially may be derived from the flight model once calculated (as is the case with time and distanced based charging metrics).

Furthermore embodiments of the present invention may also allow for novel charging or billing schemes to be used, such for example prepaid concession or contract charging schemes. A prepaid billing method may be implemented based on pre-purchased tickets that can be automatically revoked or "clipped" in lieu of payment as services are used. Conversely, contract billing methods may provide for coverage of services within an existing agreement whereas services outside this agreement may be automatically charged for using an alternative cost charging policy.

One embodiment of the present invention may also be adapted to generate individual invoice documents for the attention of an aircraft operator from each and every individual service provider which the aircraft operator has incurred a charge with. The present invention may automatically generate such individual service provider focussed invoices to ensure the appropriate service provider receives revenue for the services they have rendered in relation to a specific flight.

In one embodiment the revenue received by each service provider for chargeable utilized services incurred by an aircraft is allocated to operational units of the service provider based on the utilized services provided by the operational units. This revenue allocation process ensures accurate distribution of revenue to each operational unit of the service provider to assist in monitoring costs, profits, service provision etc.

In addition to ATM service providers, a number of service providers may operate to provide services directly to the aircraft and may not form part of typical ATM data. Such direct services may include airport ground services such as for passenger processing, boarding bridge usage, aircraft parking and housing, security charges and also for the use of various airport facilities such as catering, fuel pumping and baggage handling and the like or peripheral services, such as communications providers, insurance and finance providers. Thus, in one embodiment, the costs of the utilized services incurred by the aircraft directly (herein termed direct services) are calculated independently of the flight details. In one embodiment, details of the direct services provided to an aircraft operator are inputted via at least one mobile data entry device communicatively coupled to the processing system.

Mobile data entry permits direct services providers to input information on the service provided at the time of service delivery and thus provides real-time data on the services provided.

Accurate data collection and analysis is important for the preset invention to ensure that charges are calculated and invoiced correctly and thus, in certain embodiments, data identified by the processing system as containing possible data integrity errors is stored in a data repository for analysis and/or correction.

At least one embodiment of the present invention may provide many potential advantages over the prior art.

In the first instance, at least one embodiment of the present invention may provide a central flight modelling facility which in turn can centralise the calculation and invoicing processes of multiple aviation service providers. A single model of a flight may in turn be used to generate invoices from multiple service providers which have costs owed to them by the operator of the aircraft.

At least one embodiment of the invention may also process received flight details into final invoiceable charges via a number of operational modes, including a real-time mode. In a real-time mode such cost information may be made available to an aircraft operator within a comparatively short period of time after the final completion of the flight or at a specific time. This real-time operational mode may allow for aircraft operators to provide taxi like services, allowing costs incurred by passengers to be calculated in real-time immediately after a "taxi" flight has landed.

In addition to an infrastructure and manual labour cost saving the present invention may also accelerate service provider's billing cycle and payment remittance timeframes. The invoices can be generated promptly and can thus be audited or validated easily with respect to the utilized services. The accuracy and speed of the system provided may promote prompt payments from aircraft operators.

At least one embodiment of the present invention may also mitigate revenue losses present when manual charge calculation systems are employed. Through automation of the invoicing process there is a reduced potential for clerical errors which result in missed revenue or disputed charges with aircraft operators.

BRIEF DESCRIPTION OF THE DRAWINGS

Further aspects of the present invention will become apparent from the following description which is given by way of example only and with reference to the accompanying drawings.

DETAILED DESCRIPTION OF CERTAIN INVENTIVE EMBODIMENTS

Figure 1:
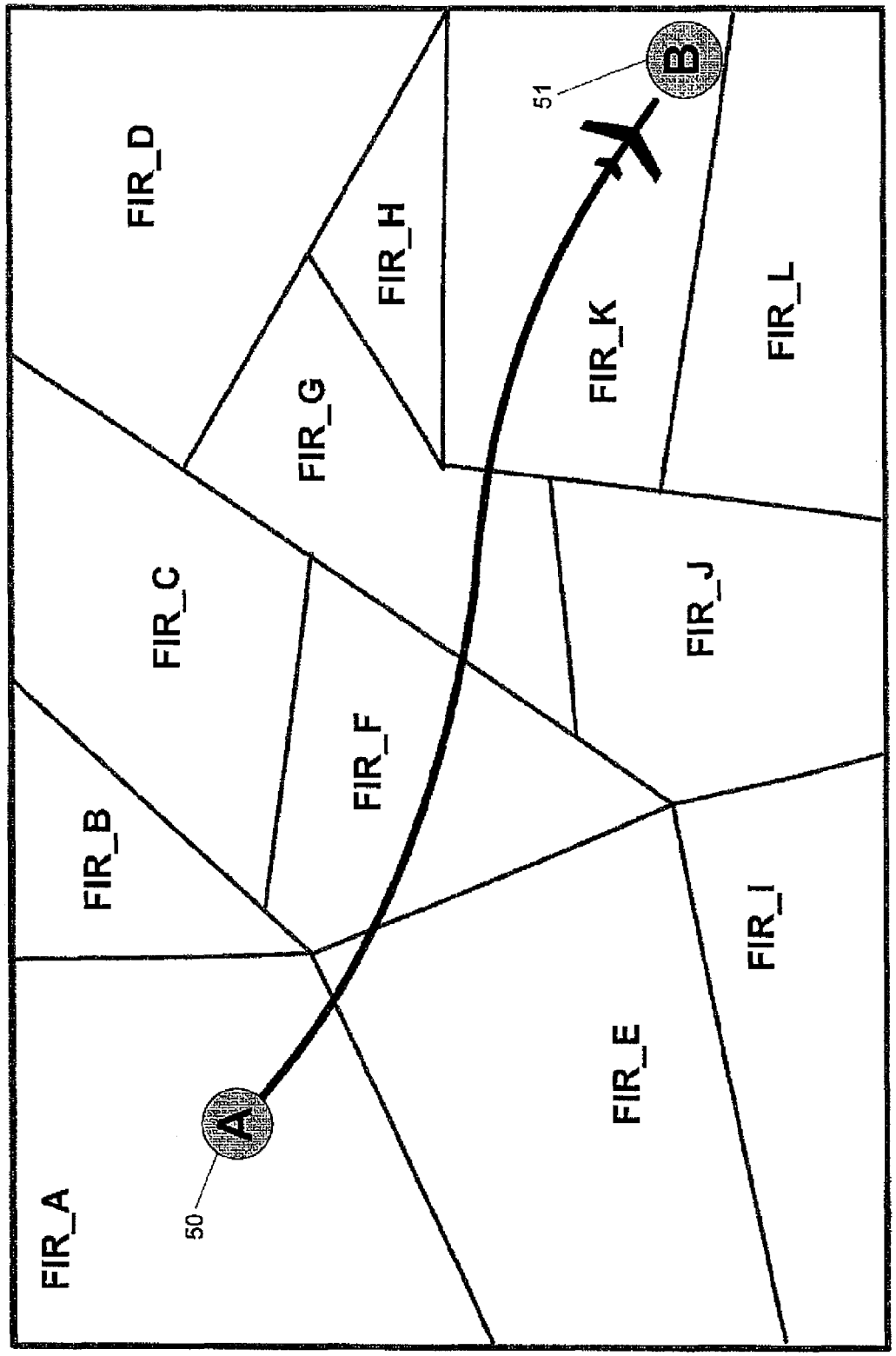
FIG. 1 illustrates a schematic view of the entities involved with providing source data for the calculation of a flight model in conjunction with one embodiment.

FIG. 1 illustrates a schematic view of the entities involved with providing source data for the determination of a flight model in conjunction with one embodiment of the present invention.

FIG. 1 also shows a geographical representation of the territories or Flight Information Regions (FIR) traversed in the execution of an example flight by an operator of an aircraft.

As can be seen from FIG. 1, the aircraft initially departs from airport A (50) and utilizes service A's airport and air traffic control departure services. Airport A is also situated within FIR A and therefore becomes the responsibility of the air traffic management (ATM) service provider, in this case the traffic control of airport A (50), of FIR A after take off. The aircraft operator then utilizes the ATM en route services provided with respect to FIR A, E, F, G and K as the aircraft is en route to final destination airport B (51) within FIR K. Finally, the aircraft employs the services provided at airport B (51) for air traffic control and arrivals.

As can be seen from FIG. 1, the execution of a single flight may employ the services of multiple service providers over multiple regions and incur costs with these service providers. The services provided within each FIR may be modelled by considering that the services are generally similar in similar types of airspace. For example, en route services may incur only minimal guidance and monitoring services from the air traffic control responsible for that FIR whereas additional ground and air traffic control services may be required as the flight departs airport A and/or arrives at airport B.

The data for determining each FIR through which a flight travels may be sourced from air navigation data sources such as the flight data processing systems used to support air navigation and ATM operations. The safety and efficiency requirement of air traffic control ensures these processing systems carry accurate data. Thus these systems may be effectively used to source the flight details required to calculate charges for all services provided to the flight during en route travel, in terminal navigation areas and in landings and departures.

The air navigation data may be obtained by direct capture of data from ATM systems, importation of flight information from flight records and spreadsheets, or direct entry of flight information by a data entry operator.

Information relating to airport ground services such as passenger processing, air-bridge usage, parking, aircraft housing, security and other airport facilities are not generally integrated into Air Navigation Systems (ANS) and thus must be sourced directly from the relevant service operator. These services are hereinafter referred to as "Direct Services". It will be appreciated that the present invention may also process supplemental services that may be provided to a flight, e.g. internet access, communications services, ground transport, food and cleaning providers. The direct services data may be obtained through direct data entry at the time of service or through importation of data from service record spreadsheets. Direct data entry may be facilitated by mobile recordation systems whereby the service provider may input information on the service, at the time of service, and the information passed to a charging system to provide real-time billing information.

The present invention can thus be used to provide a computer model of a flight to track the aircraft's activity over time and hence the services available and provided to the aircraft. Furthermore, airport related data may be retrieved and supplied to track the provision of specific services by each of the airports A, B illustrated and any en route services provided by Air Navigation Service (ANS) providers. Direct services provided to the aircraft may also be monitored. Charges for the flight may thus be determined by tracking the complete flight, each FIR traversed and the services utilized within each FIR.

It will be appreciated that the present invention may also determine potential charges for a projected or hypothetical flight which may prove particularly useful in providing quotes or estimates to existing and potential customers. Projected flight charge modelling may also assist in testing charging rates to ensure charges are reasonable. It will be appreciated that any hypothetical flight data may be stored and processed separately to 'real' flight data to ensure that hypothetical flights are not inadvertently invoiced.

Figure 2:
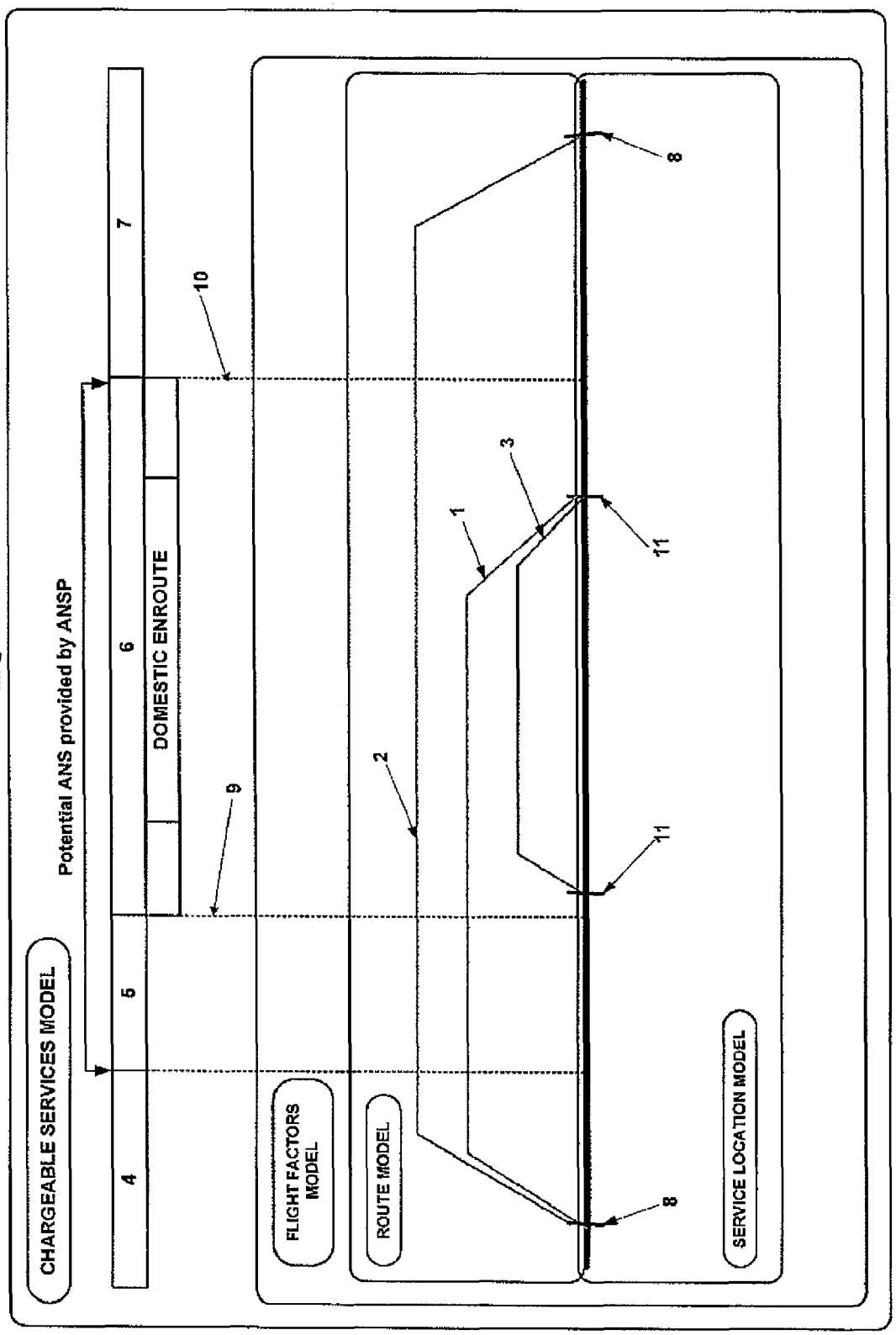
FIG. 2 illustrates a diagram of the information models utilized and their interrelation according to one embodiment.

FIG. 2 shows a diagram of the information models used in the present invention and the way in which the information sources available are used to determine which services are attributable to a flight.

The Route model considers the various possible routes of a flight, including inbound/outbound international flights (1), international over-flights (2) and domestic flights (3).

The Service location model determines all possible services and service types available to the flight from the Route model. For example, services may include tower control, other air navigation services or any ATM system service. The range of services available at, or from a location will depend on the primary purpose of the relevant airport or ANS provider and the equipment and facilities available. Airports may be categorised depending on the common available services and/or if they are under the control of a single service provider. Thus, all services available to a flight may be defined by whether they are:

location specific, i.e. only available at certain locations, or
  standard availability, i.e. normally available or normally available at a particular location type, The services may be further categorised by service level, i.e. some airlines may only use service providers with a certain level of service or capability.

The Flight factors model is used to determine which services are utilized by the flight based on flight factors specific to the flight. For example, one flight factor may consider that some flights may only utilize a particular ANS provider from multiple providers within an FIR or may be exempt from some charges. Other flight factors may include:

the time of day (e.g. night-time services may incur a higher charge),
  date (e.g. public holidays may incur higher charges),
  flight type (e.g. training, engineering, test, cargo, passenger, postal, military etc.),
  aircraft type (e.g. large passenger aircraft may incur different services to smaller aircraft),
  aircraft operator (e.g. some operators may have agreements with certain airports and be exempt from some charges).

Thus, the Service Location, Route and Flight Factors model may be used to determine the available services on a route and the services actually utilized.

The Chargeable services model may then be determined by modelling the flight into individual flight information regions (4, 5, 6, and 7) and considering whether there are applicable chargeable services for each FIR. The example shown in FIG. 2 determines the potential air navigation services provided by an ANS provider in each applicable FIR. For example, the en route ANS provider provides services over flights within FIRs (5) and (6). However, international airports (8) are different ANS providers and therefore services in FIR (4) and (7) are not chargeable to the en route ANS provider of FIRs (5) and (6).

As shown in FIG. 2, the ANS provider may charge for navigation services:
 for the international en route service (6) between FIR boundaries (9) (10),
 for the oceanic en route FIR (5), and
 for domestic flights (3) between domestic airports (11).

Figure 3:
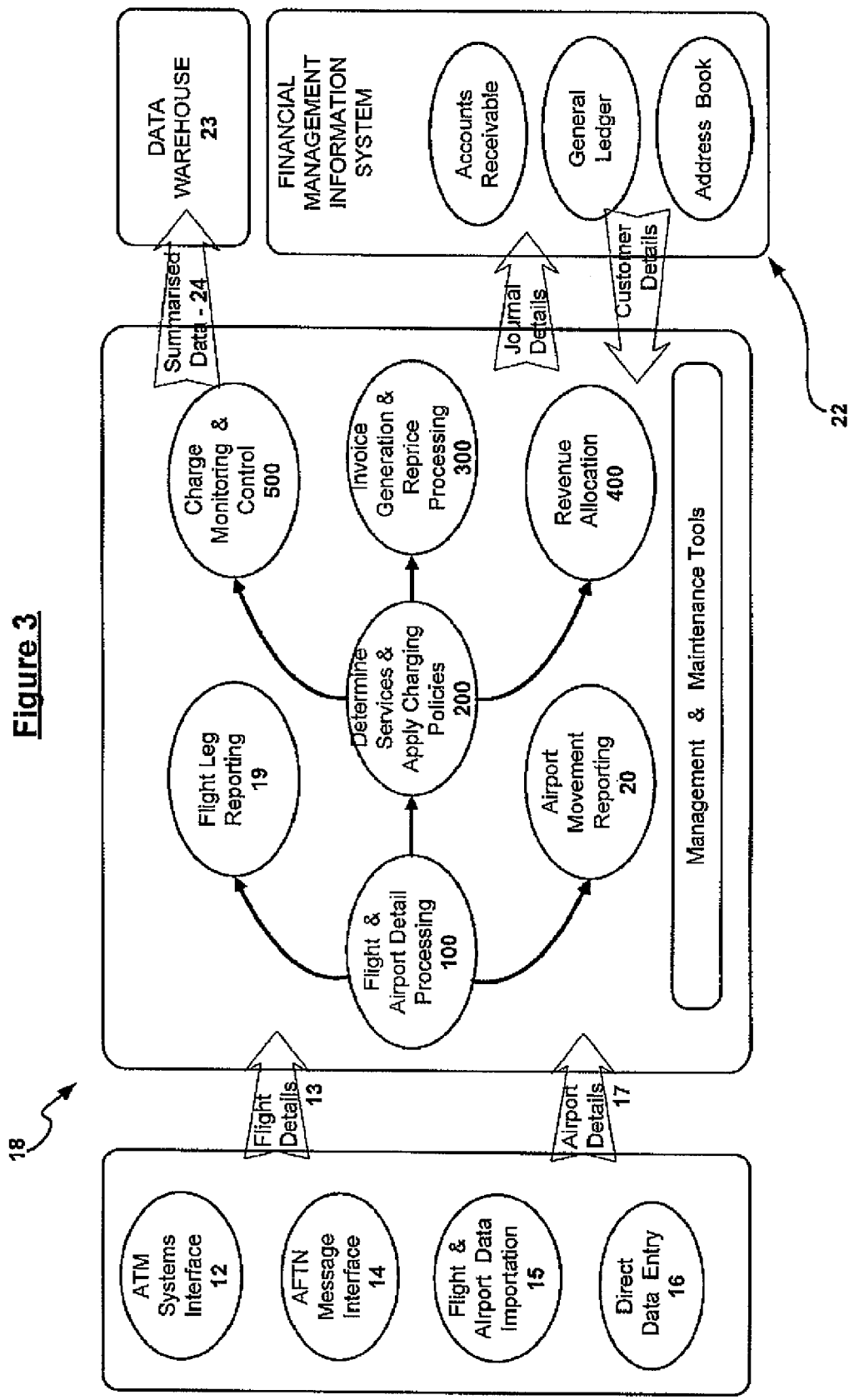
FIG. 3 illustrates a high level diagram of the main functional processes of the present invention according to one embodiment.

The functional components of the present invention according to one embodiment are shown in FIG. 3 which illustrates the data acquisition and processing procedure for modelling a flight and determining charges. As shown in FIG. 3 a range of possible data sources relating to the flight within each FIR may include:
 an ATM systems interface (12) that sources flight details (13) directly from ATM systems in 'real-time';
 an Aeronautical Fixed Telecommunications Network (AFTN) interface (14) which monitors vital flight information such as distress messages, urgency messages, flight safety messages, meteorological messages, flight regularity messages and aeronautical administrative messages (the present invention may also be adapted to source data in the FAA Aircraft Situational Display to Industry (ASDI) format);
 flight and service provider data importation systems (15) used to import data from flight records and/or aircraft service provider records;
 direct data entry (16) by operators monitoring and recording flight information, airport ground services and/or supplemental services. As described above, manual data entry may be performed at remote sites and the data transmitted in real-time to the flight and service processing system (18)

A further possibility (not shown) for a data source may include an internet-based application that allows data entry online. The present invention may also be provided as an online service to customers.

The data (flight derails (13) and airport details (17)) acquired is processed by the flight and service processing system (18) which embodies the major functional processes of the present invention.

The flight and service processing system (18) includes a Flight detail processing procedure (100) which identifies the content of the data sourced and ensures all of the flight details (13) for each physical flight are collected and the debtor identified. Thus the information regarding the flight for each flight leg and aircraft movement at each airport may be reported for analysis once processed by the Flight detail processing procedure (100).

Airport movement reporting (20) may include data on flight arrival, departures and movements within the airport vicinity, and may also take into consideration 'implied' movements, e.g. an aircraft may make multiple approaches (due to aborted approaches) which may thus imply multiple departures which must be accounted for and applicable services charged.

It will be appreciated that the various ATM systems used as data sources may operate using different processing languages and protocols and it may be necessary to provide conversion algorithms to convert non-compatible data-types to code readable by the software running the processes of the Flight detail processing procedure (100). The present invention includes a gateway server to receive, store, forward and archive the real-time or batched data from the data sources as aforementioned, The gateway server may also be capable of converting (if necessary) the incoming data (13, 17) to a format readable by the Flight detail processing procedure (100). Each functional process of the flight and service processing system (18) is preferably adapted to read both AFTN and ASDI message formats.

The data received from the data sources as aforementioned may generally be provided as one of the following 'messages'.
 Traffic Movement Information (TMI). This records aircraft movement at an airport or terminal area and can be used to identify non-planned air traffic movements. The TMI is generally provided in AFTN format.
 Flight Plan Activation. This message represents the intended flight plan of the aircraft and is sent via AFTN and/or ASDI when a coordinated radar flight data processing system indicates the flight is 'activated'.
 Flight Plan Deletion. This message is constructed and transmitted when a flight plan is terminated. This message contains all the information relating to aircraft activity since generation of the Flight Plan Activation message. The deletion message may be provided in ASDI or AFTN though is preferably provided in ASDI format as tests have shown that ASDI provides more comprehensive diversion handling.
 Direct Services. This message contains information on the services provided directly to an aircraft e.g. ground services, and is normally transmitted as an ASDI message.
 Automatic Terminal Information Service ATIS. Standard automated message for transmitting information on approach conditions e.g. weather, default landing runways.

The present invention alleviates some of the problems associated with variations in ATM system technologies by defining a minimum set of data elements required to correctly calculate charges for most charging policies. This data set may consist of one or more of: aircraft count, aircraft type, departure/destination airport, flight rules, flight detail identification number, flight detail type, flight movement date/time, flight number, ICAO flight type, immediate return indicator, message source code, movement count movement type, record type code (real, projected or quotation), touch-down indicator.

After the data has been processed by the Flight and airport detail processing procedure (100) the services actually provided are determined and charging policies for each service provider applied at the "Determine chargeable services and apply charging policies" process (200) to calculate the total charges for all the services provided. Invoices can be generated directly at (300) or the charge information first processed by a financial Management Information System (MIS) (22).

After the charges have been determined, the revenue generated may be internally allocated (400) to each business unit or, if applicable, to a sub-contracting service provider of the main service provider. The allocate revenue process (400) may also be run for reporting and analysis purposes. The allocate revenue process (400) can create an internal service delivery view for customers to facilitate service delivery 'cost vs. revenue' analysis.

The Charge monitoring and control procedure (500) ensures that incorrect invoices are credited and provides correcting information to charge calculations. For example, a service may have been charged at a full rate but only a partial service provided and thus charge correction may be required.

Also shown in FIG. 3 are management and maintenance tools (21) that are used to update the functional processes of the flight and service processing system (18) if/when required and include maintenance systems for monitoring changes in charging policies, aircraft ownership, operation, service providers etc. The maintenance tools may also be used to change charging specifications and parameters and the like.

A 'data warehouse' (23) is also shown in FIG. 3 which may store the data produced by the flight and service processing system (18), preferably in a summarised form (24) for later retrieval for reporting purposes.

The ability of the flight and service processing system (18) shown in FIG. 3 to collect, process and store data relating to a flight and the services provided thereto allows accurate and complete billing and performance data to be produced and analysed and can assist the aircraft operator, airports and other service providers in optimising their services and procedures.

The flight and service processing system (18) shown in FIG. 3 may be operated under different contexts. For example, an airline may use the application to monitor its aircraft flights and the charges incurred and compare with invoices actually received to ensure it is being correctly charged. Alternatively, single or multiple charging authorities may use the procedure to monitor services provided and charge accordingly.

Flight Detail Processing

Figure 4:
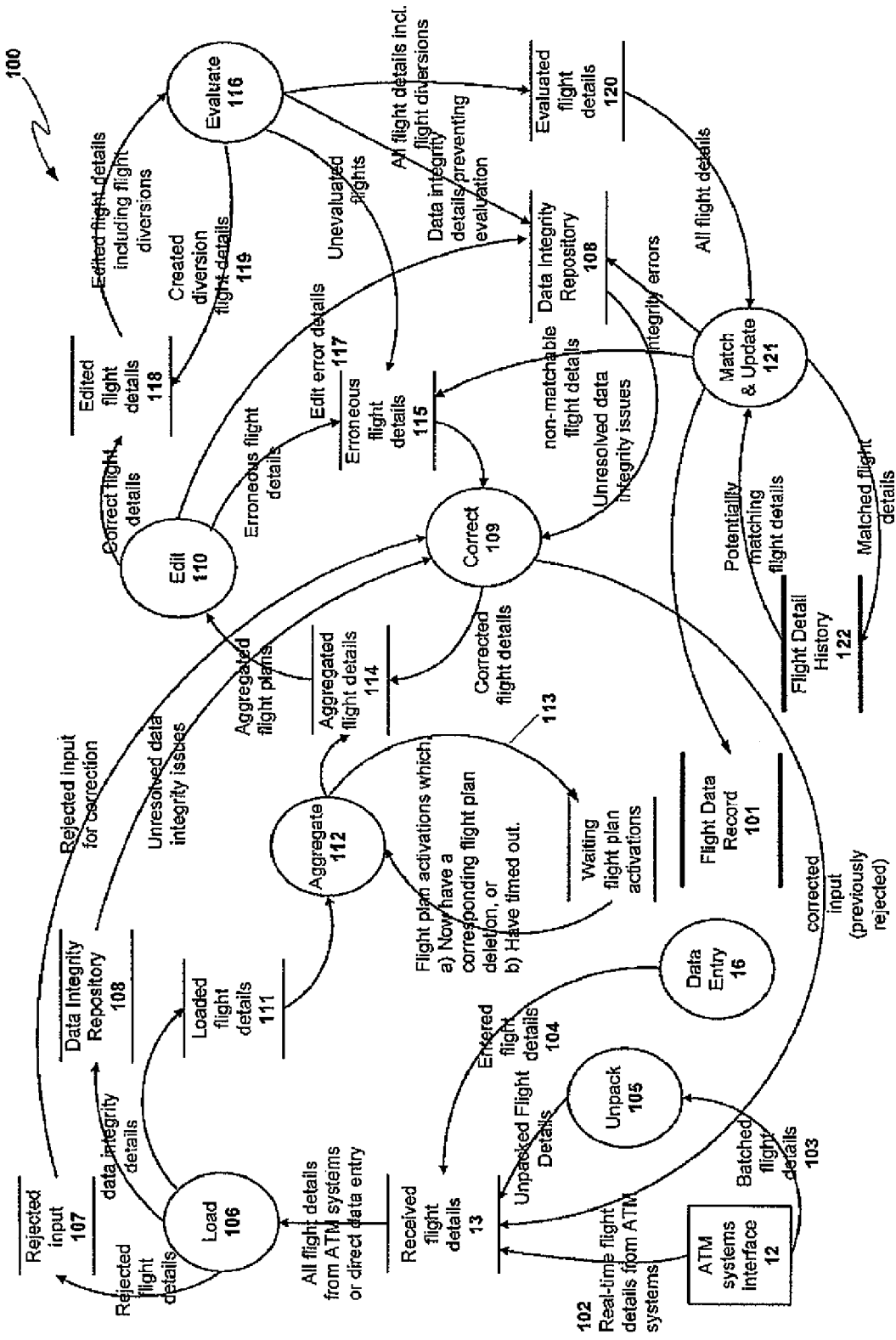
FIG. 4 illustrates a flowchart of the processes used to determine the details of a flight according to one embodiment.

The flight detail processing procedure (100) shown in FIG. 3 is illustrated in detail in FIG. 4 and shows the steps by which the flight details (13) relating to each flight are determined by matching and collating data from the ATM systems interface. It will be appreciated that the flight detail processing procedure (100) may be applied to data from other data sources as shown in FIG. 3 and may also be used for aircraft movement and ground services data.

Loading Data

The flight detail processing procedure (100) shown in FIG. 4 begins with data acquisition from the data source (in this example the ATM systems interface (12)) and ends with a complete flight data record (101). The initial flight details (13) from the ATM systems interface (12) may be loaded into the correct format for processing from any one of three sources including:

real time (102) data, or
batched sets of flight data (103), and/or
manually entered data (104).

Batched sets of data (103) must be unpacked (105) into individual data entries before loading (106).

Any data that cannot be loaded is passed as rejected input (107) and then corrected (I 09). Data that may have possible integrity errors is copied to a data integrity repository (108). The data integrity repository (108) provides warning and notification messages to the operator when a data integrity error occurs. Data integrity errors may include erroneous or incomplete attribute values, conflicting information, the presence of a record when absence is expected (and vice versa), or an operation that is not compatible with the status of a record. The data within the data integrity repository (108) may be passed for correction (109) by the edit process (110).

Aggregate

The remaining 'correct' data is loaded as loaded flight details (111) then 'aggregated' (112) in order to simplify the data for further processing. The aggregate process (112) merges flight detail records relating to a particular flight or aircraft that have been loaded from a single data source (e.g. a single ATM system). This process is necessary as some ATM systems may generate two flight detail records representing one flight instance, i.e. the first record (activation) represents the commencement of a flight and the second record (deletion) represents the conclusion of a flight. The possibility of aborted arrivals/departures and restarts means that receipt of a single activation/deletion pair is not guaranteed and thus duplications and missing records must be accommodated for by either aggregating (112) or matching (121). Activation/deletion pairs may also arise when multiple ATM systems have responsibility for the flight through different procedures or FIRs. For example, when an aircraft passes through an FIR each ATM system responsible for that FIR will record an 'activation' on entry and a 'deletion' when the aircraft exits. The aggregate process (112) preferably does not merge records that relate to different ATM systems as this step will be performed by the matching process (121).

The aggregate process (112) shown in FIG. 4 ensures any standalone activations (113) that are not matched with a corresponding deletion (flight completion) within a predetermined time interval (i.e. a missing record) are passed to the editing process (110). Activations with a corresponding deletion are aggregated by converting to a single flight detail record before editing (110) in order to simplify the data (into a single record) for further processing.

Edit

The aggregated flight details (114) are then passed to the edit process (110). The edit process (110) ensures the flight details are correct and therefore the resultant flight data record (101) valid. The edit process (110) also involves correcting 'erroneous' flight details (115) in the data integrity repository (108) and passing correct details for evaluation (116). Any unresolved data integrity issues and errors (117) identified in the edit (110) or evaluation processes (116) are copied to the data integrity repository (108) and subsequently corrected (109).

Correct

The correction process (109) provides the capability of operator interaction to correct missing details, content of the data integrity repository (108), or erroneous flight details (115). This is generally preformed by a user monitoring and editing the data.

Evaluation

The evaluation process (116) 'evaluates' the edited flight details (118) to determine:

which services were available to the flight,
the customer or entity required to pay the charges e.g. by using an algorithm to convert aircraft call signs into customer identifiers,
any flight diversions or anomalous activity, i.e. the evaluation process (116) may compare the actual flight details with the original flight plan to identify any diversion details (119) and thus identify any services that may have been utilized that have not been factored into the charging calculations and may require the operator to update the software with new service provider details.

The evaluation process (116) also sets counters to measure the workload of the particular service provider.

The evaluation process (116) thus determines all of the factors (services available, flight operators, flight details and diversions), to then provide evaluated flight detail records (120) for calculating charges.

Match

Matching (121) is an important process to ensure that:
flight detail records from different flights are not matched together (over-matching) which may result in loss of revenue as only a single customer will be charged for all of the different flights matched together, and flight detail records of a single flight are matched together, and thus avoid multiple separate flight records for a single flight (under-matching) being charged to the customer.

The Match sub-process contains an algorithm to resolve the issue of separating the continuous stream of flight details from multiple aircraft in multiple flight information regions, into the single best data description of each flight. This is achieved by comparing certain parameters of flight detail records in the Flight detail history (122) and applying a rating system to determine how closely matched incoming flight detail records are to existing flight detail records in the Flight detail history (122) in order to determine whether the flight detail records relate to an existing flight or begins the description of another flight. The rating system may utilize threshold values that are used to define a level of similarity such that compared flight detail records may be considered to relate to a single flight. Chronological events of the flight detail records may also be compared and if the times for a particular event match or are substantially similar the flight detail records may be matched (121). If flight detail records are matched (121) using only 'similar' attributes, i.e. low rating match, they may be marked for later manual analysis.

Update

When a pair of flight detail records has been matched (121), one of the records is updated with the flight details from the associated matching record to provide a single flight detail record. This single record is stored in the Flight detail history (122) and the next flight detail record processed. If no match can be made between the flight detail record being matched and any records in the Flight detail history (122) then a new flight detail record is made and stored in the Flight detail history (122). The Flight detail history (122) contains all flight detail records and forms a long term repository for flight detail information.

Thus the match and update process (121) ensures that, as the incoming flight detail records are processed, records relating to a single flight are matched together and thus the flight details may be stored as a single accurate record of the flight for determining services utilized and calculating the associated service charges. When the matching process matches a final 'deletion' record, the flight is deemed to be completed and the complete set of data is stored as a Flight Data record (101). This Flight Data Record (101) can be considered to provide the best single representation of a complete flight.

During the match and update process (121), 'incorrect' matches may occur and require correction. While the 'incorrect' matches are typically identified by a human operator or automatic checking procedures, the correction of the error may be easily achieved by 'un-processing' the records as shown in FIG. 5.

Un-Processing

Figure 5:
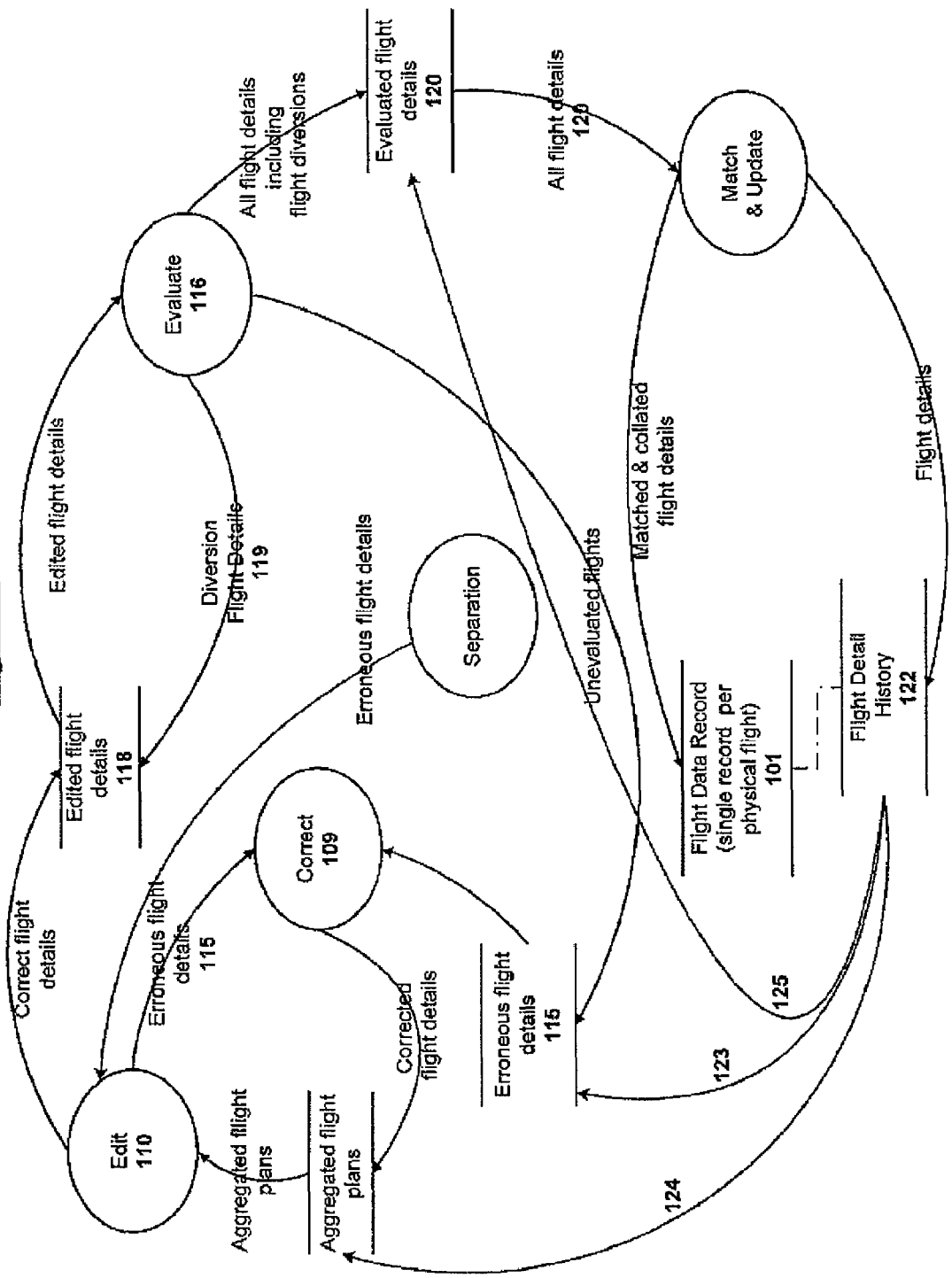
FIG. 5 illustrates a flowchart which shows the steps to 'unprocess' incorrect flight details determined by the process shown in FIG. 4.

In the un-processing procedure shown in FIG. 5 the incorrectly matched records are:

(123) passed as erroneous flight details (115) to the correct process (107) for correcting and reprocessing if incorrectly matched due to errors in flight derails, or (124) passed to the edit process (110) if the incorrect match has resulted due to errors in evaluation rules or the static data of the flight detail processing procedure (100). It will be appreciated that the evaluation rule errors would need to be fixed before re-processing to prevent the same error from recurring, or (125) separated if only one record is identified as being erroneous, the erroneous record being passed to editing (110) while the correct record is passed back to the match and update (121) process as an evaluated flight detail record (120).

If records do not contain errors but are not matched correctly then they may be 'force-matched' or 'force-separated'. Records may be force-matched if they are identified as matching but not matched by the match and update process (121). Records that do not match, (but matched by the match and update process (121)) may be 'force-separated' by an operator.

Direct Services

Figure 6:
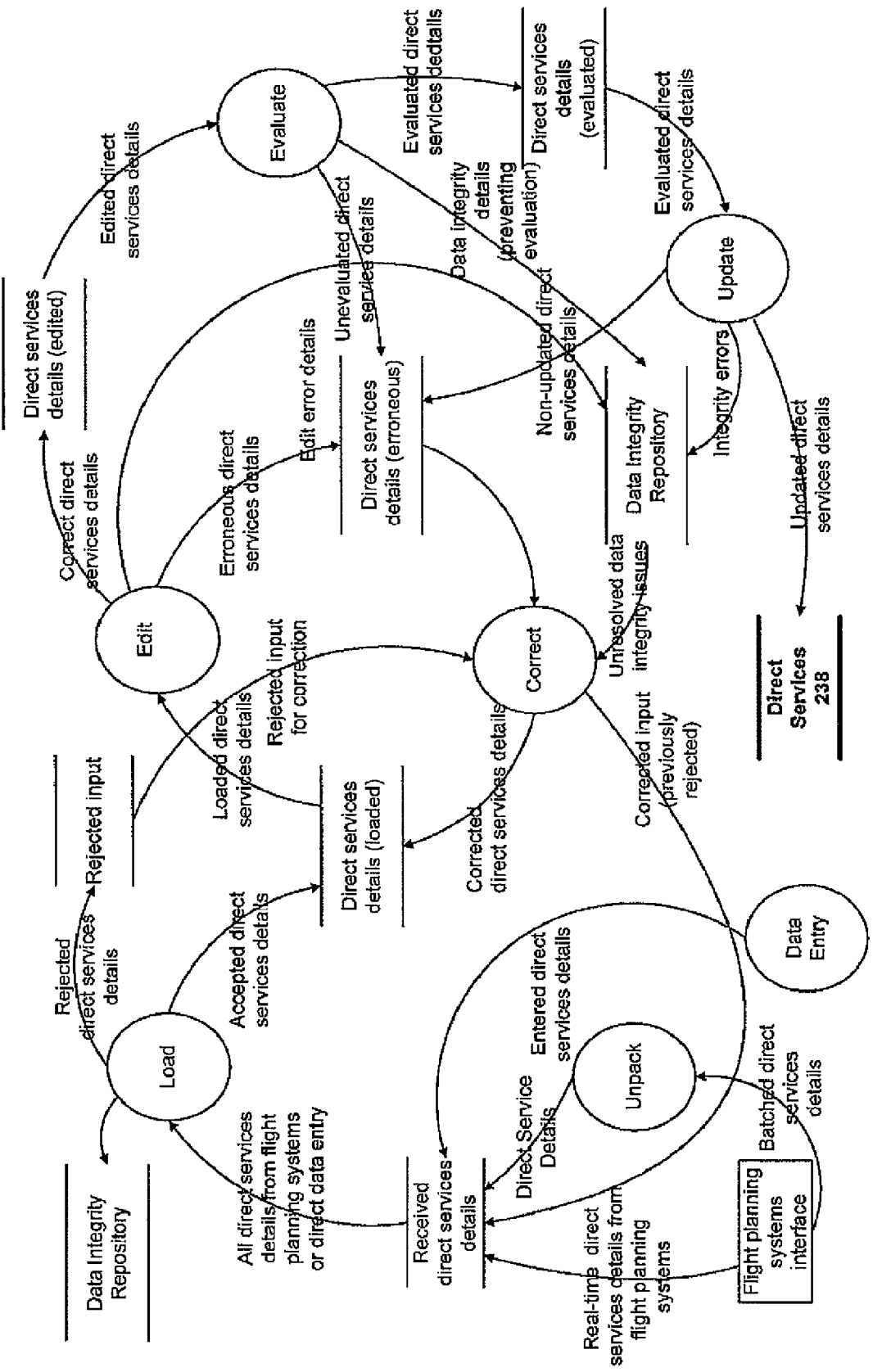
FIG. 6 illustrates a flowchart of the processes used to determine 'Direct Services' provided to a flight according to one embodiment.

Direct services (238) relate to services that are directly attributed to a specific flight or aircraft. Processing direct services (238) provided to the aircraft when on the ground is performed by the present invention by a similar process to the Flight detail processing procedure (100) shown in FIG. 4. A representative process diagram is shown in FIG. 6 and is generally analogous to the Flight detail processing procedure (100) of FIG. 4. For brevity, only the differences will be explained herein. Direct services (238) are generally provided by only a single provider in a single location and therefore the aggregate (112) and matching (121) processes of the flight detail processing procedure (100) are not required when processing direct services. Furthermore, as Direct services (238) do not require 'determination' (i.e. they are entered directly into the system) there is no direct equivalent to the flight data record (101). All other process steps are generally analogous to those described above in relation to the Flight detail processing procedure (100).

Determine Chargeable Services

Figure 7:
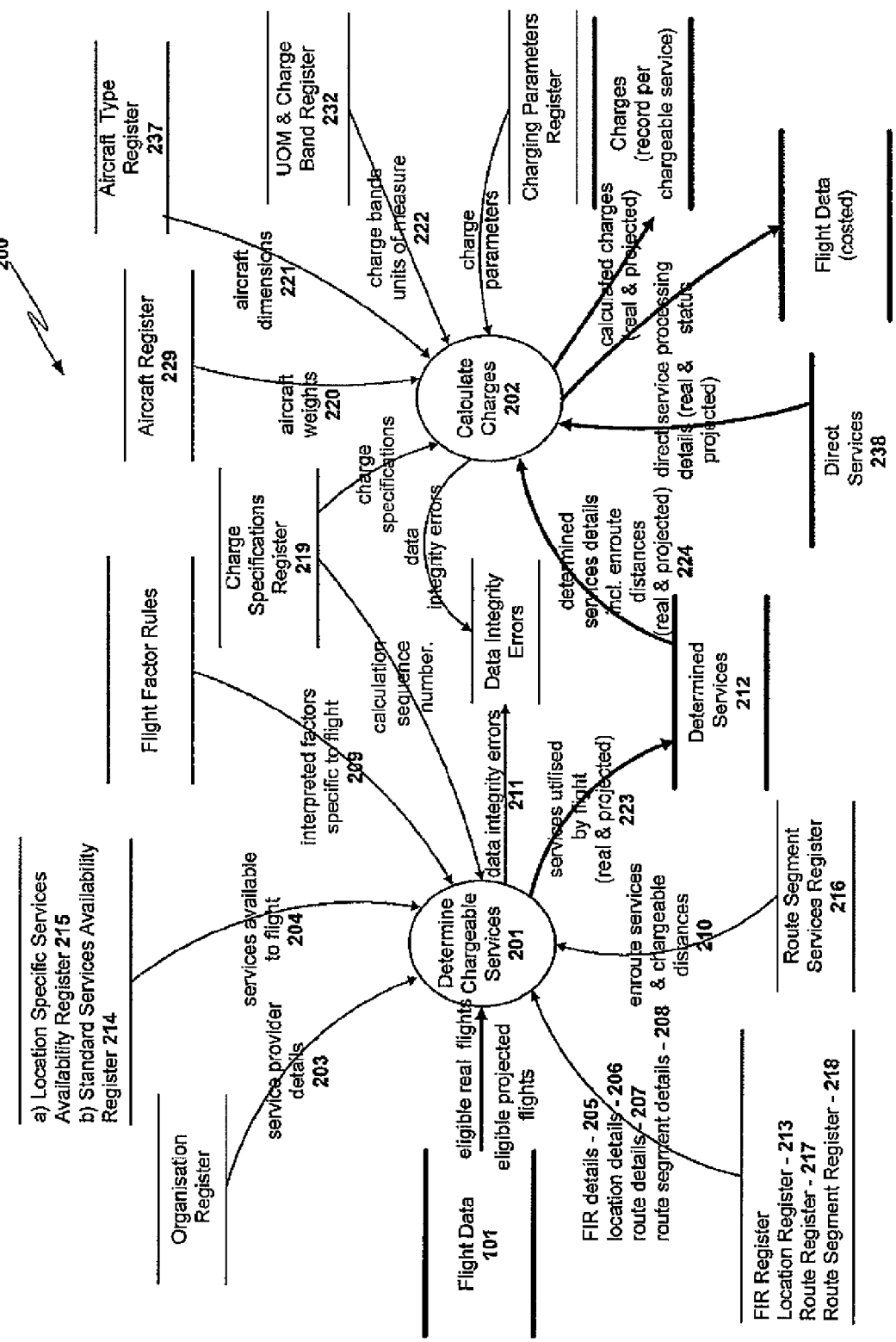
FIG. 7 illustrates a schematic diagram showing the data sources used to determine the services chargeable to a flight and calculate the corresponding charges according to one embodiment.

FIG. 7 illustrates the information sources used by the Determine Chargeable Services (200) algorithm to determine (201) the chargeable services utilized by real or projected flights and the data needed to calculate (202) the associated charges. To determine (201) the chargeable services utilized by a flight, the flight data record (101) (as shown in FIG. 4) is collected along with details of the service providers (203), services available (204), FIR details (205), locations (206), route (207), route segments (208), any flight factors (209) (e.g. certain flights may not utilize a particular service as a general rule or other flight-specific factors may need to be taken into consideration), and details of en route services and chargeable distances (210). Any data integrity errors (210) are passed to a repository (212) for manual correction.

Information on specific locations, including services that may be available at that location by default, may be stored in the location register (213). The standard services availability register (214) stores information relating to the 'standard' or default services and respective providers available at each FIR. Information on location-specific services (which are used instead of an analogous default service, or may be a different service-type) may be stored in the location specific services availability register (215).

Thus, to determine which services are provided at a particular location, the 'default' services and service providers are determined for a particular movement type (e.g. arrival or departure) and the location specific services availability register (215) accessed to determine if any of such default services need to be replaced with a location-specific service or whether there are additional services to consider. Similarly, airport service providers (including ground and peripheral services) are stored in the standard services availability register (214) and location specific services availability register (215).

The route segment services register (216) contains information regarding services available over a flight and sections the route into 'route segments', herein defined as the smallest chargeable distance unit for a route. A route segment must therefore be defined for each portion of the route where the combination of service provider/service/service provider subsidiary is unique. This means each route segment only relates to a single FIR and cannot overlap two or more FIRs.

The services available for a route segment, as stored in the route segment services register (216), may include information on such factors as:
  Start and end locations for the route segment,
  Segment name (this may be provided by the International Civil Aviation Organisation (ICAO))
  Chargeable distance between start and end locations,
  Great Circle distance between start and end locations,
  FIR and FIR sector codes Information on the route and route segments may be stored in the Route register (217) and Route segment register (218). Information on the relevant services available are stored in the Route segment services register (216) and includes start and end points of the route, the default ANS provider for that service, the service code used to identify the type of service provided in the route segment (may be defined in terms of ICAO airspace class), an organisation unit code used for revenue allocation and a billable service indicator.

EN Route Charges

When determining the en route service charges for a flight the following steps are performed:
  a) The departure and arrival locations are used to obtain the route identifier from the route register (217).
  b) The list of all the route segments may then be obtained from the route segment register (218).
  c) If a route segment is in a chargeable FIR the route segment distance is also is obtained from the route segment register (218).
  d) For each route segment the service provider and service information is obtained from the route segment services register (216) to determine the charging specifications (219) to apply.
  e) The associated en route charges are then calculated using the charging specifications (219), route segment distance, and other flight factors such as aircraft weight (220) and type (221) and the applicable charge band (222) to be applied.

The chargeable services utilized by the aircraft during the flight can be determined by considering which services are available to the flight in each route segment and therefore, based on the flight factors (209) specific to the flight the chargeable services utilized.

Calculate Charges

The utilized service details (223) which define the determined chargeable services (224) are then used to calculate the charges for the particular flight using a 'calculate charges' algorithm (202).

Figure 8:
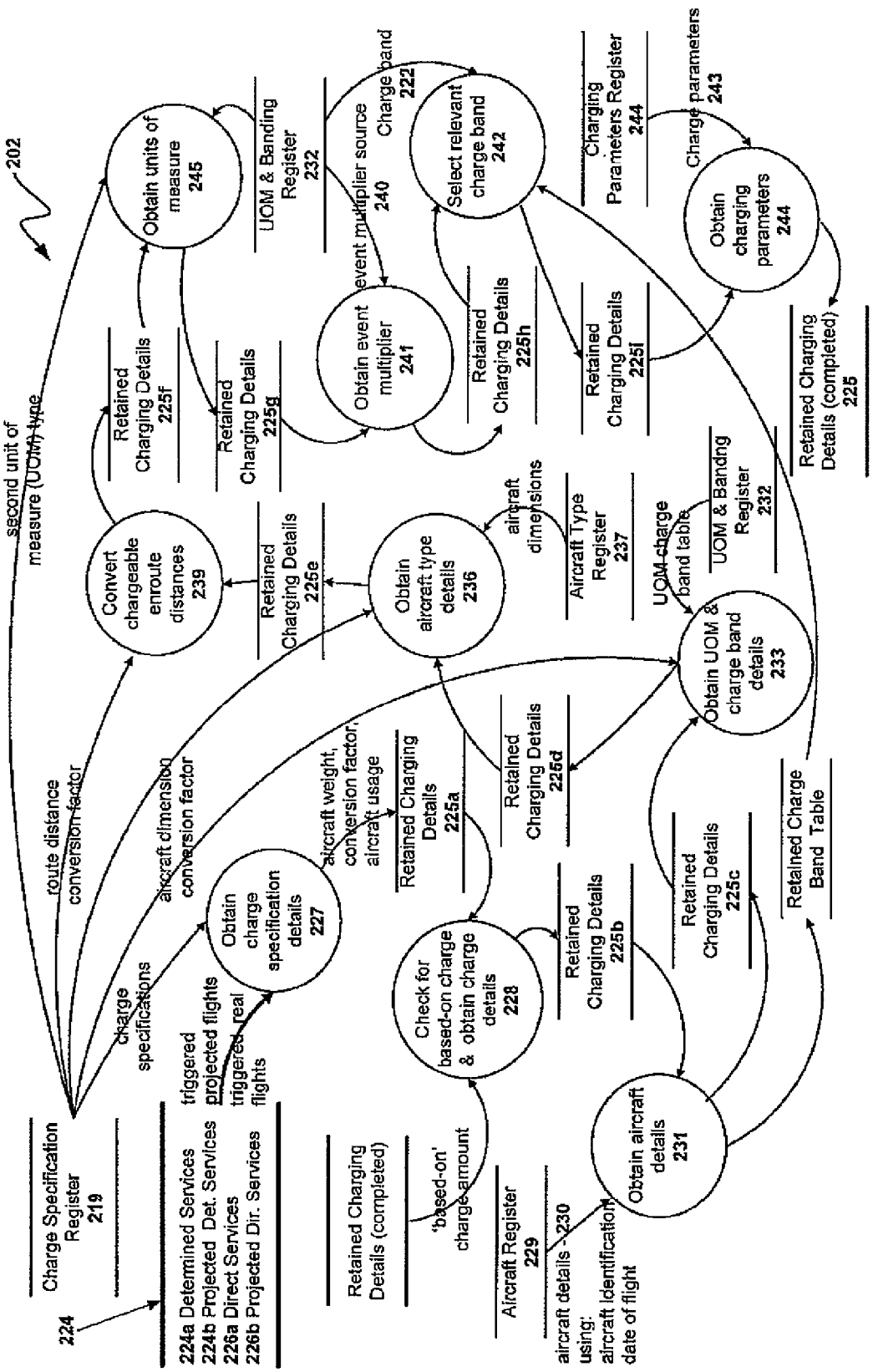
FIG. 8 illustrates a flowchart of the processes used to determine the details needed to perform the calculating charges procedure shown in FIG. 7.

The complete set of charging details (225) used to populate the calculating formulae of the calculate charges algorithm (202) are determined in the process shown in FIG. 8. FIG. 8 shows each step in determining the complete set of retained charging details (225) and the information sources used at each step. It will be appreciated that direct services (238) do not require the service determination process (201) and are passed directly to the calculate charges algorithm (202) to calculate the associated charges.

The separation of the determine chargeable services (201) and calculate charges (202) processes (as shown in FIG. 7) into two distinct processes provides for error checking and auditing purposes, i.e. the determined chargeable services (224) may be extracted to a report for consideration without calculating charges and the calculations do not need to be 'built in' and performed simultaneously with the determine chargeable services process (201) which thus reduces the necessary processing power and likelihood of errors.

With respect to FIG. 8 the chargeable services (224) identified (including the real Direct (226a) and Determined (224a) services or projected Direct (226b) and Determined (224b) services) are used to determine the charging specifications (227) from the charging specifications register (219) using the service provider code, service code and date of flight. The charging specifications (227) refer to the rules defining the:
  Event multipliers (240), which are integer values used to multiply the charges for multiple events. For example, if there has been more than one flight, as indicated by the flight data record (101) or if there have been multiple approaches/departures then the service may have been performed multiple times;
  Units of Measure, which relate to the units of measure used by the particular service provider;
  Conversion factors, which relate to the conversion rate at which the units of measure for each specific service provider are converted into common standard units for subsequent calculations;
  Charge calculation sequence, which is important if any charges are 'based-on' other charges;
  Rounding rules, i.e. any specific rounding rules applicable to the service charges;
  Currency, i.e. the currency in which the charge is to be made;
  Variables common across all charge bands for a specific service e.g. a price change factor defining the rate of change of a price.
  Tax rates to be applied, The retained charging details (225a) may be checked (228) for charges that are 'based on' another service. For example, a night landing surcharge may be calculated as a percentage of a typical landing charge and thus the night landing charge can be considered to be 'based on' the landing charge.

Aircraft Register

The specific aircraft details (230) are accessed from an aircraft register (229) using aircraft identifiers and the date of flight and the flight-specific details of the aircraft are added (231) to the charging details (225b). The aircraft register (229) may be accessed to identify customers using the aircraft identification to provide aircraft specific information for charging purposes. Where the aircraft identification is unknown, the aircraft ICAO operator code and aircraft type may be compared with a fleet aircraft record to provide common aircraft information and common charging policies applied accordingly. The aircraft register (229) is preferably 'date-ranged' so that the correct customer is charged for a service provided at a particular time/date e.g. if an aircraft is sold and the aircraft operator changed, the date of transfer must be recorded to ensure that services are billed to the correct operator of the aircraft at the time the service was provided.

The customer number of each aircraft operator may vary between service providers and thus the present invention preferably includes an Address book translation table (not shown) to record the service provider customer number against a 'universal' system customer number which is used by the flight and service processing system (18).

The 'units of measure and banding register' (232) is then accessed to obtain (233) the units of measure and charge bands available and that may be applicable. This information is added to the charging details (225c). At this stage, the specific charge band (222) and units of measure (234) applicable to the flight are not determined.

The aircraft dimensions (235) are then obtained (236) from the aircraft type register (237) to take into consideration any aircraft-type specific charges, e.g. larger aircraft may incur a larger landing charge at airports than a relatively smaller aircraft. The aircraft dimensions (235) determine which charge band (222) is applicable for that flight. For example, charge bands (222) are generally determined by aircraft weight, seating capacity, the distance traveled and/or duration of flight. This information is added to the charging details (225d).

The next step involves determining (239) a chargeable distance (usually defined by Great Circle calculations) traveled by the flight en route. This distance does not include any part of the route within a terminal FIR e.g. within terminal manoeuvring areas or aerodrome control zones and is only applicable for en route services. This information is added to charging details (225e).

The applicable units of measure (245) are then determined for the specific flight and/or service so that the charges are made in the correct currency at the correct rate for each parameter. For example, the aircraft weight may be entered into the system as weight by pounds, metric tonnes, kilograms etc. and therefore it is important that the correct charge rate is applied for that unit of measure to avoid over/under charging. This information is added to charging details (225f).

An event multiplier is then obtained (241) and added to charging details (225g).

The applicable charge band (222) for the service may then be obtained (242) based on the information from the service (224) and aircraft (230, 235) details. This information is added to the charging details (225i).

The charge band (222) may contain one or more of the following exemplary formulae which is used to calculate the charge for the applicable service:

Fixed amount,
Weight charge rate*weight units,
Fixed amount+(weight rate*weight units),
Fixed amount+(weight rate*SQRT(Weight units)),
Weight rate*weight factor,
Time rate*time units,
Aircraft Area rate*Aircraft Area units*time units,
Fixed amount+(time rate*time units),
Weight rate*weight units*time units,
Distance rate*distance units/integer
(Distance rate1*distance units)+(distance rate2 (distance units/integer)*weight units),
Distance rate1*(distance units/integer1)*SQRT(weight units−weight adjustment)/integer2)
Distance rate*(distance units/integer) weight factor
Distance rate1*distance+(distance rate2*distance units/integer1*SQRT((weight units−weight adjustment)/integer2))
A Ratio*Calculated Charge
A ratio*calculated charge*time units
Charge rate*Charge Coefficient It will be appreciated that any formula may be utilized for a particular charge band (222) and the above formulae are for exemplary purposes only. It has been found by the applicant that charge formulae, including those mentioned above may be expressed without reference to the units of measure to simplify the calculation and data processing. Thus the formulae may be collected into groups, each group applicable for a charge band (222). The formulae may be expressed without reference to specific parameters and generally fall under one of the following five groups:

Linear A: This group comprises formulae using only addition, subtraction, multiplication and division and may contain:
Fixed amount
Rate*quantum (e.g. aircraft weight)
Fixed amount+rate*quantum
Rate*quantum1*quantum2
Fixed amount+rate*quantum1*quantum2
Linear B: This group consists of the first three formulae of Linear A plus the following two formulae:
Rate1*quantum1+rate2*quantum2
Fixed amount+rate1*quantum1+rate2*quantum2

The inclusion of the first three formulae ensure that where a charge band (222) only requires simple results (i.e. using one of the first three formulae), only a single group is accessed, thereby simplifying processing.

The formulae of the next two groups are characterised by the inclusion of the square root of a quantum e.g. aircraft weight charges are often based on the square root of the weight rather than a linear 'charge-by-weight'.

SQRT A: This group comprises the formulae using only √quantum and addition, subtraction, multiplication and division. The group may include the following:
Fixed amount
Rate*quantum
Rate*√quantum
Fixed amount+Rate*√quantum
SQRT B: This group consists of the first three formulae of SQRT A plus the following formulae:
Rate*quantum
Rate*quantum 1+rate2*√quantum2
Fixed amount+Rate*quantum
Fixed amount+Rate*quantum I+rate2*√quantum2
Fixed amount+Rate*√quantum
BasedOn: This group essentially involves applying a scaling factor to any calculated charge:
Scaling factor (>0.0)*charge Finally, the relevant charge parameters (243) are obtained (244) from the charging parameters register (246). The charge parameters (243) specify the standard charging formulae (as exemplified above) to be used in the charge calculations and any minimum charge amounts. The charge parameters (243) also contain any charging elements not already accounted for.

Figure 9:
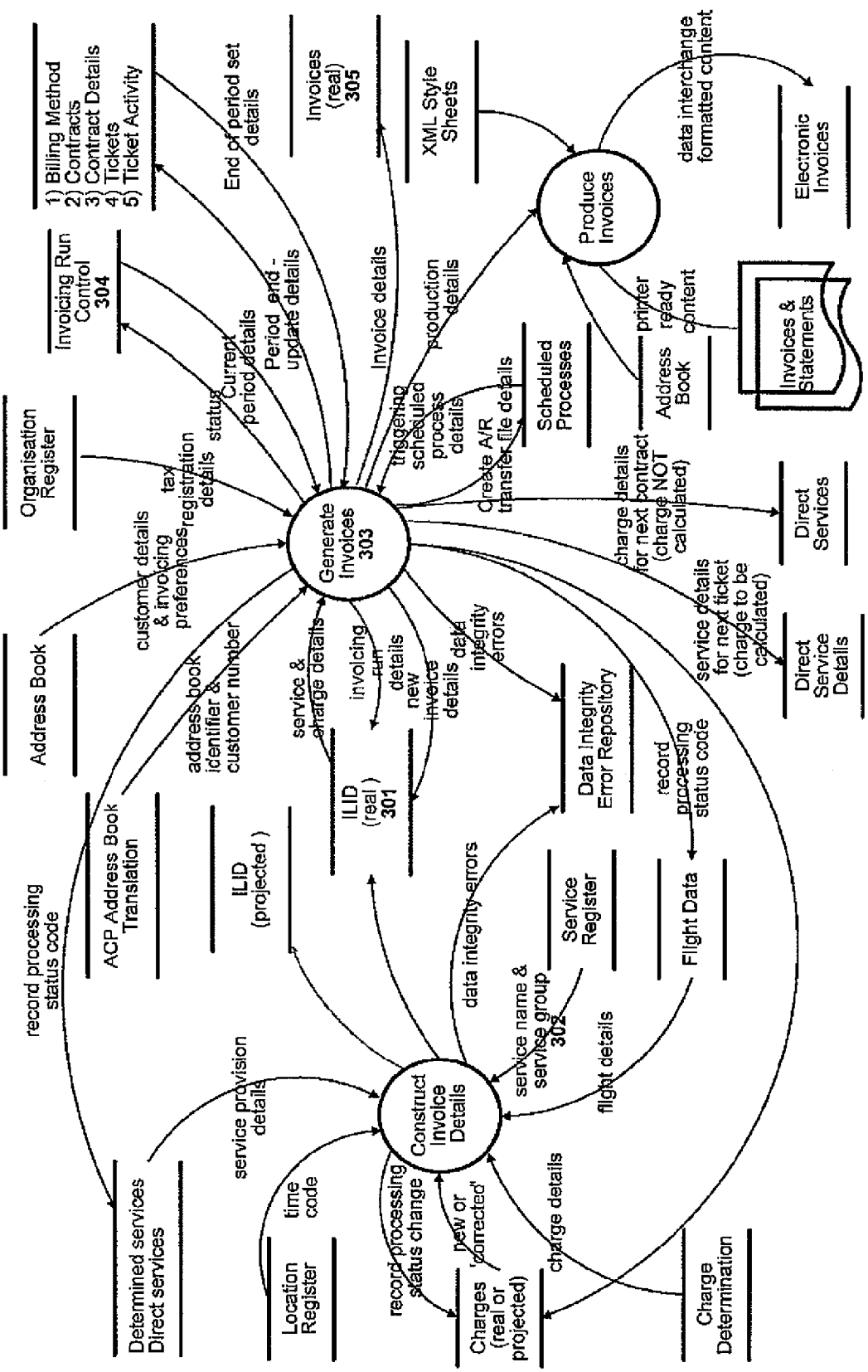
FIG. 9 illustrates a schematic diagram showing a method of invoice processing according to one embodiment.

Once the complete set of charging details (225) have been determined, the charges may be calculated and invoices generated. A representative diagram of an exemplary invoice generation process (300) is shown in FIG. 9. For brevity the invoicing process (300) will be described in general only and it will be appreciated that one skilled in the art would be able to determine the details of the process given FIG. 9 and the descriptive labelling thereon.

The invoicing process (300) may process real or projected flights. However, invoices are not generated for the projected flights and instead the invoice details for the projected flight may be exported to a reporting process for quoting to the customer.

The invoicing process is used to create a single Invoice Line Item Detail (FLID) (301) for each chargeable service provided to a flight. This ILID (301) forms the basis of any subsequent invoice generated.

Record fragmentation may arise from internal revenue allocation processes as charges are separated into the appropriate service provider unit. This fragmentation may be eliminated by identifying related fragmented records from service name and group codes (302) and grouping such fragmented charge records into a single ILID (301). As charge records are grouped together, the related ILID (301) accumulates the charge amounts from each associated charge record. These accumulated charge amounts are stored as an un-rounded total in the ILID (301) but must be rounded for invoicing and report generation, Rounding all charge values at invoicing (300) ensures that total values in any financial reports balance with the totals of invoices regardless of the number of invoices considered. In contrast, adding and rounding the charge values at a reporting stage may cause a discrepancy between the amounts reported and the totals of the corresponding invoices i.e. invoices totalled then rounded will provide a different value than invoices rounded then totalled. The rounding cannot occur before the ILID (301) is generated as the charge for a service must be the same regardless of if it is calculated as a number of part charges (e.g. route segment services for multi-segment routes) or as one complete charge.

Over the progress of a flight, additional details may be available and thus changes made to the flight data record (101). Any such changes may require the deletion and regeneration of all previous data generated in the determining chargeable services (201) and calculating charges (202) processes (as shown in FIGS. 7 and 8).

This is accomplished by the automated real-time processes forming the flight and service processing system (18) which constantly update the flight data record (101) and ensure that up-to-date reports and invoices may be generated at any time. This obviates, or at least minimises, the need for often lengthy end-of-period scheduled runs typical of many invoicing systems. Furthermore, any changes to static parameters (for example, changes in the Aircraft Register (229) will require the flight data record (101) to be unprocessed and all existing data deleted. As the unprocessed flight detail records are reprocessed, and a new flight data record (101) is created, the data in the determining chargeable services (201) and calculating charges (202) processes will be regenerated and reflect the changes. Thus, the ILID (301) may always reflect the current state of all service charges based on known flight details (13).

The generate invoices process (300) is scheduled to generate invoices (303) for each service, of each service provider to the flight, on a timer activation and completes when the last invoice, for the last selected service provider has been generated and a completion notification message produced. A 'locking mechanism' prevents the same set of flight details (13) being reselected for another 'generate invoices' run. In some applications the invoices may be generated on demand or at a scheduled time depending on the needs of the customer.

The generate invoices process (300) may be performed as a standard, 'end-of-billing-period' run or a 'reprice' run. A 'reprice' run is an intra-billing-period run that generates invoice or credit note details for charges found to be in error.

Each type of invoice run may be in 'proof' or 'final' mode. In 'proof' mode the invoices may be checked before issuing to minimise any need for issuing credit notes for erroneously charged invoices. In the 'final' mode the invoices are generated and issued without further analysis.

A new invoicing run control (304) record is created at the end of each run, for each participating service provider, for the next billing period.

The present invention is also capable of accommodating contract or prepaid services, e.g. concession 'tickets'. Consequently, the present invention may be configured such that contractors providing the services under the contract for an agreed remuneration are excluded from receiving automated invoicing.

The requirements for the end-of-month processing of the 'tickets' and 'contracts' billing methods are also included. These may result in new charges being calculated and additional invoice line item details constructed for inclusion in the current billing period.

It will be appreciated that the invoice details and ILID (301) records may be produced in any suitable format. For example, in the example shown in FIG. 9 the updated LID (301) and invoices (305) are in a form that is suitable for transformation into formatted output for either printing or electronic distribution. Either a report writer (such as Crystal Report) or an XML/XSL application may be used to effect the transformation though these are exemplary only.

At least one embodiment of the present invention thus provides a system that may capable of modelling a flight and the services available over the course of the flight to accurately and efficiently determine which services are utilized by the flight and charge the flight operator for such services. The efficient processing system may allow the flight details and the chargeable services to be determined in real-time by sourcing flight and service information from the multiple available data sources.

At least one embodiment of the present invention also provides a semi-automated system that only requires users to resolve data integrity issues, customer queries and monitor the processes and system performance.

Embodiments of the present invention have been described by way of example only and it should be appreciated that modifications and additions may be made thereto without departing from the scope thereof.

The invention claimed is:

1. A method of modelling a flight of an aircraft using at least one computer system, the method comprising:
   sourcing flight details from at least one data source using at least one data acquisition system, wherein the flight details are compiled from a plurality of flight detail records within a single flight information region (FIR) and are validated and aggregated via a matching algorithm into a single flight detail record representative of the activity of the aircraft within an FIR; and
   compiling a single flight model from the validated and aggregated flight details using a processing system, the single flight model indicating the activity of the aircraft over the duration of a journey from a departure port to an arrivals port in:
   two or more FIRs; or
   an entire flight undertaken in a single FIR,
   wherein the processing system uses the flight details to determine utilized services from available services, within an FIR, to the flight; and
   wherein data representative of the activity of the aircraft in an FIR is not limited to the data recorded in that FIR.

2. The method of claim 1, wherein the at least one data source includes an air traffic management (ATM) system providing automated electronic aircraft tracking, the tracking including at least one of the following i) primary and secondary radar ATM systems, ii) GPS based tracking systems, iii) satellite tracking systems and iv) aviation communication systems.

3. The method as claimed in claim 2 wherein the at least one data source includes a plurality of disparate ATM systems.

4. The method as claimed in claim 1, further comprising determining the available services to the flight within the FIR by accessing at least one services availability register including stored data on the available services in at least one FIR.

5. The method as claimed in claim 1, further comprising comparing the flight details with known flight factors specific to the flight to determine the utilised services.

6. The method as claimed in claim 1, further comprising calculating at least one charge for at least one utilised service by the flight.

7. The method as claimed in claim 6, wherein the charge calculation incorporates the time of day and/or date the utilised service is provided.

8. The method as claimed in claim 1 wherein the flight details are hypothetical and the processing system is used in a simulation capacity to model a hypothetical flight and subsequently calculate a hypothetical set of services charges to be incurred.

9. The method as claimed in claim 1 wherein the flight details include at least one flight detail record generated by a single source of ATM data.

10. The method as claimed in claim 9, further comprising executing an aggregation process before the flight model is compiled, the aggregation process correlating multiple flight detail records relating to data from a single ATM system into a single aggregated flight detail record.

11. The method as claimed in claim 10 wherein the flight detail records are correlated by matching time and/or location recordings from each flight detail record for each ATM system.

12. The method as claimed in claim 9, further comprising collating flight detail records relating to a single flight from a plurality of flight detail records relating to a plurality of flights by comparing corresponding parameters from each the flight detail record and applying a rating algorithm to determine a level of correlation.

13. The method as claimed in claim 9, wherein a flight detail record is recorded from input from an ATM systems messaging system.

14. The method as claimed in claim 9, further comprising executing a matching algorithm prior to the compilation of the flight model, the matching algorithm correlating consecutive sets of flight detail records from separate FIRs relating to a single flight.

15. The method as claimed in claim 14, wherein the matching algorithm detects the transition of an aircraft between FIRs.

16. The method as claimed in claim 14, wherein the matching algorithm correlates aircraft position at the instance of FIR boundary crossings to correlate separate sets of flight detail records of a single flight sourced from ATMs in two adjacent FIRs.

17. The method as claimed in claim 1, wherein the flight model includes the available services drawn from ATM data and airport-related data sources.

18. The method as claimed in claim 17, wherein the ATM data indicates type and number of utilised services provided to an aircraft during take off, en route via one or more transition FIRs and landing at a destination airport.

19. The method as claimed in claim 17, wherein at least one airport-related data source provides information on the available services and utilised services.

20. The method as claimed in claim 1, wherein revenue received by each service provider for chargeable utilised services incurred by an aircraft is allocated to operational units of the service provider based on the utilised services provided by the operational units.

21. The method as claimed in claim 1, wherein costs of utilised services incurred by the aircraft directly defined as direct services are calculated independently of data from the flight details.

22. The method as claimed in claim 21, wherein details of the direct services provided to an aircraft operator are input via at least one mobile data entry device communicatively coupled to the processing system.

23. The method as claimed in claim 1, wherein data identified by the processing system as containing possible data integrity errors is stored in a data repository for analysis and/or correction.

24. A system for modelling a flight of an aircraft, the system comprising:
at least one data acquisition system configured to source flight details from at least one data source, wherein the flight details are compiled from a plurality of flight detail records within a single flight information region (FIR) and are validated and aggregated via a matching algorithm into a single flight detail record representative of the activity of the aircraft within a single FIR; and
a processing system configured to compile a single flight model from the validated and aggregated flight details, the single flight model indicating the activity of the aircraft over the duration of a journey from a departure port to an arrivals port in:
two or more FIRs; or
an entire flight undertaken in a single FIR,
wherein data representative of the activity of the aircraft in an FIR is not limited to the data recorded in that FIR.

25. The system of claim 24, wherein the at least one data source includes an ATM system providing automated electronic aircraft tracking, the tracking including at least one of the following: i) primary and secondary radar ATM systems, ii) GPS based tracking systems, iii) satellite tracking systems and iv) aviation communication systems.

26. The system as claimed in claim 25, wherein services available to the flight within the FIR are determined by accessing at least one services availability register, the register including stored data on the services available in at least one the FIR.

27. The system as claimed in claim 24, wherein the system is configured to determine the services utilised by the flight for at least one of: i) the duration of the flight calculated from the flight model, ii) a FIR calculated from the flight details and iii) a comparison of the flight details with known flight factors specific to the flight.

28. The system as claimed in claim 24, wherein the flight details include at least one flight detail record generated by a single source of ATM data.

29. The system as claimed in claim 28, wherein the processing system is configured to execute an aggregation process before the flight model is compiled, the aggregation process correlating multiple flight detail records relating to data from a single ATM system into a single aggregated flight detail record.

30. The system as claimed in claim 29, wherein the flight detail records are correlated by correlating time and/or location recordings from each flight detail record for each ATM system.

31. The system as claimed in claim 29, wherein the processing system is configured to collate flight detail records relating to a single flight from a plurality of flight detail records relating to a plurality of flights by comparing corresponding parameters from each the flight detail record and applying a rating algorithm to determine a level of correlation.

32. The system as claimed in claim 28, wherein the flight detail record is recordable from input from an ATM systems messaging system.

33. The system as claimed in claim 32, further comprising a matching algorithm configured to be executable prior to the compilation of the flight model.

34. The system as claimed in claim 33, wherein the matching algorithm correlates consecutive sets of flight detail records from separate FIRs relating to a single flight.

35. The system as claimed in claim 33, wherein the matching algorithm detects the transition of an aircraft between FIRs.

36. The system as claimed in claim 35, wherein the matching algorithm correlates aircraft position at the instance of FIR boundary crossings to correlate separate sets of flight detail records of a single flight sourced from two adjacent FIRs.

37. The system as claimed in claim 28, wherein the flight model includes the available services drawn from ATM data and airport-related data sources.

38. The system as claimed in claim 37, wherein the ATM data indicates type and number of utilised services provided to an aircraft during take off, en route via one or more transition FIRs and landing at a destination airport.

39. The system as claimed in claim 37, wherein at least one airport data source provides information on the available services and utilised services.

40. The system as claimed in claim 24, wherein revenue received by each service provider for chargeable utilised services incurred by an aircraft is allocated to operational units of the service provider based on the utilised services provided by the operational units.

41. The system as claimed in claim 24, wherein the processing system further calculates costs of utilised services incurred by the aircraft directly (herein termed direct services) and calculated independently of the flight details.

42. The system as claimed in claim 41, wherein the direct services provided to an aircraft operator are input via at least one mobile data entry device communicatively coupled to the processing system.

43. The system as claimed in claim 24, wherein data identified by the processing system as containing possible data integrity errors are stored in a data repository for analysis and/or correction.

44. A system for modelling a flight of an aircraft using at least one computer system, the system comprising:
  means for sourcing flight details from at least one data source using at least one data acquisition system, wherein the flight details are compiled from a plurality of flight detail records within a single flight information region (FIR) and are validated and aggregated via a matching algorithm into a single flight detail record representative of the activity of the aircraft within an FIR; and
  means for compiling a flight model from the validated and aggregated flight details using a processing system, the flight model indicating the activity of the aircraft over the duration of a journey from a departure port to an arrivals port in two or more FIRs or an entire flight undertaken in a single FIR, wherein the processing system uses the flight details to determine utilized services from available services, within an FIR, to the flight.

\* \* \* \* \*